Aug. 16, 1927.

B. E. HAWLEY 1,639,637

LOCK NUT

Filed April 22, 1926

INVENTOR
BATES E. HAWLEY
By C. B. Birkenbeul.
ATTORNEY.

Patented Aug. 16, 1927.

1,639,637

UNITED STATES PATENT OFFICE.

BATES E. HAWLEY, OF VANCOUVER, WASHINGTON, ASSIGNOR TO AMERICAN LOCKNUT COMPANY, OF LONGVIEW, WASHINGTON.

LOCK NUT.

Application filed April 22, 1926. Serial No. 103,717.

This invention relates generally to means for preventing nuts from rotating on their bolts, due to vibration or any force other than continued application of a wrench or other tool.

The first object of this invention is to provide an exceedingly simple and efficient means for locking a nut on a bolt and also making it possible to tighten and relock the nut in an effective manner after it has once been locked in position.

The second object is to construct the lock nut so that no possible injury can befall the threads of the bolt or nut, due to any action of the lock nut other than might happen to a plain nut and bolt if abused or by accident.

The third object is to prevent water from rusting the bolt threads within the nut by providing a water-tight seal between the bolt and nut at its outer face.

The fourth object is to construct the locking elements so that the locking washer may be easily removed by backing the nut off a few turns with a wrench and then turning it in the opposite direction, which will expose the lock washer for easy removal.

The fifth object is to reduce the cost of manufacture by employing a locking ring of round cross section, and at the same time to shape the recess in the nut so that the ring will roll into the threads of the bolt and require a minimum amount of extrusion of the metal of the locking washer.

The sixth object is to construct the device so that the nut will not rotate the washer at any time, and so that the locking washer will not come into contact with the mouth of the recess in the nut.

The seventh object is to construct the nut so that the maximum amount of efficiency of the bolt is attained instead of adding to its stresses, as may be the case where double nuts are used for locking purposes when their use is not properly understood.

Figure 2:
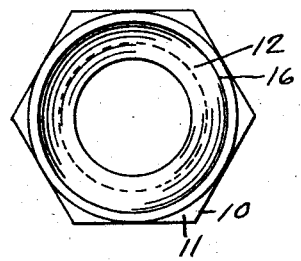
Figure 1:
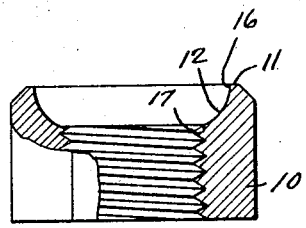
Figure 4:
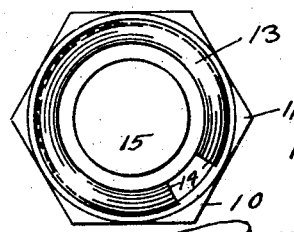
Figure 3:
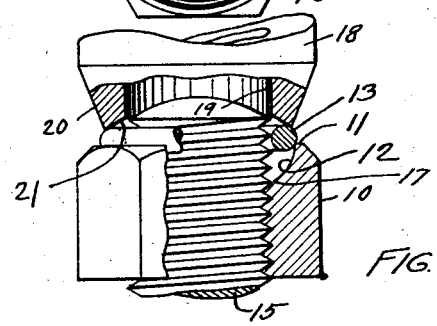
Figure 6:
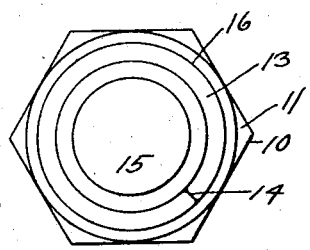
Figure 5:
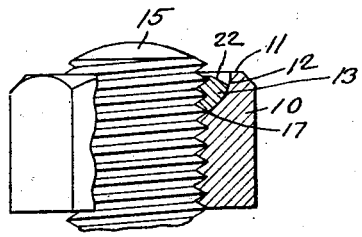
Figure 7:
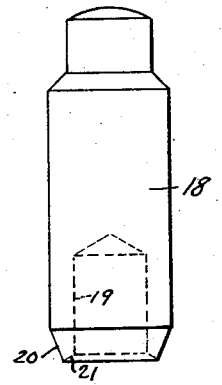
Figure 8:
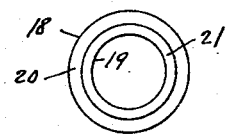

These results are accomplished in the manner set forth in the following specification as illustrated in the acompanying drawing, in which:

Figure 1 is a partial section taken through the axis of the lock nut itself. Figure 2 is a plan of Figure 1. Figure 3 is a partial section through a lock nut in place on a bolt with the locking washer in position ready to be driven home, and showing the end of the tool employed for driving the washer. Figure 4 is a plan of a nut and a bolt with the open washer in place for driving. Figure 5 is a partial section through a locked nut. Figure 6 is a plan showing the closed washer. Figure 7 is an elevation of the driving tool. Figure 8 is a bottom view of the driving tool.

Referring in detail to the drawing, in order to illustrate the invention there is shown the usual form of hexagonal nut 10 in whose chamfered side 11 is formed a rounded recess 12 the outer diameter of which is slightly less than the outer diameter of the soft copper washer 13 which is to occupy said recess. The ends 14 of the washer are spaced, as shown in Figure 4, when the washer 13 is placed on the bolt 15 and meet, as shown in Figure 6, when the nut is locked in place.

The outer edge 16 of the recess 12 is slightly less in diameter than the expanded washer 13 and its lower edge 17 terminates at the root of the outermost nut thread—that is to say—when the bolt is in place this outermost portion of the nut thread will form approximately the limit to which the copper washer can be forced into the recess. The space between the edges 16 and 17 is in the form of an arc whose center is approximately in the plane of the chamfered face of the nut.

A driving or locking tool 18 is employed and is provided with a central opening 19 and a beveled outer face 20. The edge 21 between the opening 19 and the face 20 is beveled inwardly to assist in rolling the metal into the threads and thereby still further reduce the amount of extrusion required.

In operation the nut 10 is tightened the desired amount and the soft copper washer 13 slipped over the projecting end of the bolt 15. The driving tool 18 is now placed over the end of the bolt and struck with a hammer, which causes the washer 13 to be rolled inwardly toward and around the bolt threads.

It will be observed in Figure 6 that the ends of the locked washer 13 are touching instead of spaced, as in Figure 4. It will also be noted that the upper face 22 of the locked washer is somewhat below the outer face of the nut 10. This is highly desirable, since it may happen in manufacture, handling or through actual use that the outer edge 16 of the recess 12 may become burred or nicked, which would tend to rotate the washer with the nut, which is precisely the reverse of what is desired.

If it is desired to tighten a nut further after having once been locked by the washer it is only necessary to tighten the nut with a wrench and then reset the washer with the tool 18.

If it is desired to remove the locked nut it is only necessary to back it off a few turns with a wrench sufficiently to strip the threads in the copper washer and then retighten the nut, which action leaves the washer exposed on the bolt and subject to easy removal by picking it out with a sharp tool or pliers.

It is to be noted that with this type of locking washer that it is not necessary to provide bolts of extra length, as is necessarily the case where chamfered nuts are employed.

The locking operation has a tendency to harden the metal in the washer so that its life is practically limited to one removal from the bolt, but as the cost of the washer is practically negligible, this forms no real objection to the use of the device. The bolt and nut are ready for further use by merely supplying a new washer.

Soft metal washers have long been employed in the past—for example in my Patent Number 1,443,751, over which this device is an improvement.

I claim:

1. A nut having one face recessed to receive a locking ring, said recess consisting of an annular groove having an arcuate radial section, whereby when the nut is placed on a bolt and the locking ring is placed in the annular groove of the nut and is driven in an axial direction, the groove will roll the locking ring into firm locking engagement with the threads of the bolt so that after such locking, the washer will not rotate upon the bolt when the nut is rotated in either direction.

2. A nut having one face recessed to receive a locking washer, said recess having an annular groove concentric with the axis of the nut threads, the radial section of the surface of the groove being a true arc, the center of which lies in the plane of the face of the nut, whereby when the locking washer is forced axially, the groove will guide the locking washer in a direction tending constantly to become perpendicular to the axis of the nut.

3. In combination, a bolt having continuous uninterrupted threads, a lock nut thereon having continuous uninterrupted threads, a generally zone-shaped recess in one end of the nut, said recess terminating short of the outer margin of the end face of the nut and at the nut threads, a split, non-resilient, annular washer of circular cross-section substantially surrounding the nut but with its ends spaced so that the outer diameter of the ring-shaped washer is substantially the same size as the largest diameter of the recess, whereby when the ring is driven into the recess by the concave face of an instrument of substantially the same diameter as the ring, the smooth rounded surface of the recess will guide the ring into locking engagement with the threads of the bolt.

4. In combination, a bolt, a nut thereon having its outer face provided with a substantially zone-shaped recess terminating at the outermost thread of the nut, a split washer of circular cross section somewhat loosely surrounding the bolt and having its open ends separated a distance which will allow them to meet when the washer is driven in place below the plane of the outer face of the nut, the metal of the washer rolling on the zone-shaped recess.

5. A lock nut having one face recessed, said recess having curved sides terminating at the nut threads and substantially tangent to a plane at right angles to the nut axis at the smaller diameter of the recess whereby when a non-resilient ring of circular cross section is placed on a bolt, on which the nut is fitted, and the ring is driven in the direction of the bolt axis the surface of the recess will guide the lower portion of the soft metal ring directly toward the bolt threads, with rolling action affording a closer union between the ring and bolt than between the ring and lock nut so that after the ring is driven in place a backing off of the nut will strip the ring and a tightening of the nut will create a space between the ring and the curved recess of the nut.

6. The method of locking a nut to a bolt where the nut is provided with a substantially spherical recess in the outer face, which consists in placing a non-resilient ring of circular cross section around the bolt and driving it into engagement with the bolt threads by a force which tends to rotate the entire extreme outer diameter of the ring in a downward direction whereby the ring will roll or whirl into engagement with the bolt threads.

7. In combination, a bolt, a nut thereon, said nut having a recess in its outer face, the surface of said recess being a surface of revolution coaxial with the bolt axis, and a non-resilient locking washer in the recess, deformed into firm engagement with the bolt threads but spaced from the junction edge of the recess and the outer face of the nut, whereby the washer will not rotate with the nut even tho said edge be nicked, burred, or otherwise slightly damaged.

BATES E. HAWLEY.